(12) United States Patent
Isson et al.

(10) Patent No.: US 7,801,229 B2
(45) Date of Patent: Sep. 21, 2010

(54) METHOD AND DEVICE FOR ESTIMATING THE TRANSFER FUNCTION OF THE TRANSMISSION CHANNEL FOR A COFDM DEMODULATOR

(75) Inventors: Olivier Isson, Voreppe (FR); Fabrice Belveze, Fontanil-Cornillon (FR); Fatima Aourik, Courbevoie (FR)

(73) Assignee: STMicroelectronics S.A., Montrouge (FR)

( * ) Notice: Subject to any disclaimer, the term of this patent is extended or adjusted under 35 U.S.C. 154(b) by 626 days.

(21) Appl. No.: 11/710,869

(22) Filed: Feb. 26, 2007

(65) Prior Publication Data

US 2007/0237249 A1 Oct. 11, 2007

(30) Foreign Application Priority Data

Feb. 27, 2006 (FR) .................................. 06 50663

(51) Int. Cl.
H04K 1/10 (2006.01)
H04L 27/28 (2006.01)

(52) U.S. Cl. ................... 375/260; 375/340; 375/345; 375/349; 455/501; 455/504; 455/506; 455/63.1

(58) Field of Classification Search ................. 375/260, 375/269, 340, 346, 349, 148, 144; 370/208; 455/501, 504, 506, 63.1
See application file for complete search history.

(56) References Cited

U.S. PATENT DOCUMENTS 7,145,940 B2 * 12/2006 Gore et al. .................. 375/147
7,248,559 B2 * 7/2007 Ma et al. ..................... 370/208
7,339,999 B2 * 3/2008 Gore et al. .................. 375/260
7,418,046 B2 * 8/2008 Gore et al. .................. 375/260
7,519,122 B2 * 4/2009 Hayashi ...................... 375/260
7,564,912 B2 * 7/2009 Yang .......................... 375/260

(Continued)

FOREIGN PATENT DOCUMENTS

EP 1154602 A1 11/2001
EP 1313242 A1 5/2003
WO WO 2005/081481 A1 9/2005

OTHER PUBLICATIONS

French Search Report from French Patent Application 06/50663, filed Feb. 27, 2006.

(Continued)

*Primary Examiner*—Phuong Phu
(74) *Attorney, Agent, or Firm*—Lisa K. Jorgenson; James H. Morris; Wolf, Greenfield & Sacks, P.C.

(57) ABSTRACT

A method of COFDM demodulation of symbols, each including first carriers conveying data and pilots having their frequency positions varying at least partly from one symbol to the next symbol. The method includes, for each symbol, a step of determining a first estimate of the transfer function of the channel for each carrier in a set of the first carriers of the symbol such that, for the frequency positions of the considered carriers, symbols different from the symbol include pilots, corresponding to a linear combination of second estimates determined for pilots at the frequency of said carrier. The coefficients of the linear combination are determined in iterative fashion, a new coefficient value being equal to the sum of the last value of the coefficient and of a term including the product between an iteration step and an error term, the iteration step being determined in iterative fashion.

30 Claims, 4 Drawing Sheets

U.S. PATENT DOCUMENTS

| | | |
|---|---|---|
| 2004/0086055 A1* | 5/2004 | Li .............................. 375/260 |
| 2004/0184399 A1 | 9/2004 | Chiou |
| 2005/0201475 A1* | 9/2005 | Alcouffe ...................... 375/260 |
| 2006/0018411 A1* | 1/2006 | Gore et al. .................. 375/340 |
| 2006/0029150 A1* | 2/2006 | Capozio ...................... 375/269 |
| 2007/0110173 A1* | 5/2007 | Alcouffe ...................... 375/260 |

OTHER PUBLICATIONS

Harada Y. et al.: "An implementation of OFDM receiver for digital terrestrial television broadcasting and its technologies" Broadcasting Convention, 1997 IBS 97., International (Conf. Publ. 447) Amsterdam, Netherlands Sep. 12-16, 1997, London, UK, IEE, UK, Sep. 12, 1997, pp. 337-342, XP006508780 ISBN: 0-85296-694-6.

Hutter A.A. et al.: "Channel estimation for mobile OFDM systems" Vehicular Technology Conference, 1999, VTC 1999—Fall IEEE VTS $50^{TH}$ Amsterdam, Netherlands Sep. 10-22, 1999, Piscataway, NJ, USA, IEE, US, vol. 1, Sep. 19, 1999 pp. 305-309, XP010352881 ISBN: 0-7803-5435-4.

French Search Report from French Patent Application 06/50662, filed Feb. 27, 2006.

* cited by examiner

METHOD AND DEVICE FOR ESTIMATING THE TRANSFER FUNCTION OF THE TRANSMISSION CHANNEL FOR A COFDM DEMODULATOR

BACKGROUND OF THE INVENTION

1. Field of the Invention

The present invention relates to a method and a device for estimating the transfer function of the transmission channel for a so-called COFDM ("Coded Orthogonal Frequency Division Multiplex") demodulator.

2. Discussion of the Related Art

A COFDM modulation may for example be implemented for the radio transmission of digital video data according to the DVB (Digital Video Broadcasting) standard. Such a standard also provides radio transmission of digital video data to mobile receivers (standard DVB-H).

Figure 1:
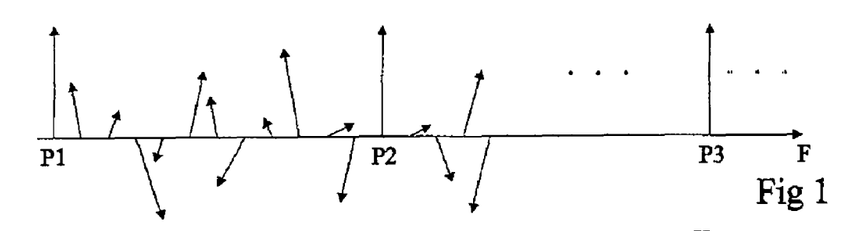
FIG. 1, previously described, shows carriers modulated in phase and in amplitude in a COFDM transmission system.

FIG. 1 is intended to illustrate the principle of a COFDM modulation. Packets of data to be transmitted are put in the form of N complex coefficients associated with N respective frequencies (or carriers). Number N of the frequencies is for example equal to 1,705 for the so-called "2K" mode and to 6,817 for the so-called "8K" mode in digital television radio transmission. Each complex coefficient corresponds to a vector which is illustrated in FIG. 1 as starting from a frequency axis at a point indicating the frequency associated with the coefficient.

These N coefficients are altogether processed by inverse fast Fourier transform (IFFT), which generates a "symbol" formed of a sum of modulated carriers, each carrier having an amplitude and a phase determined by the associated complex coefficient. The symbol thus generated is transmitted.

Conventionally, in radio transmission, the width of the transmit channel is 6, 7, or 8 MHz and each carrier is separated from the next one by a frequency interval $\Delta f = 1/Tu$. Tu is the duration of the transmission of a symbol and is called the useful duration. The useful duration is on the order of 224 μs in 2K mode and 896 μs in 8K mode, for a 8-MHz bandwidth.

On reception, a receiver submits the symbol to the inverse processing, that is, mainly, a fast Fourier transform (FFT) to restore the initial complex coefficients.

As shown in FIG. 1, some regularly-distributed vectors P1, P2, P3 ... have a known constant value. These vectors, or the corresponding carriers, are called pilots. They are used to reflect the distortions undergone by the transmitted signal and by the information that they provide relative to transmit channel response, and enable correcting the unknown vectors located between pilots.

Figure 2:
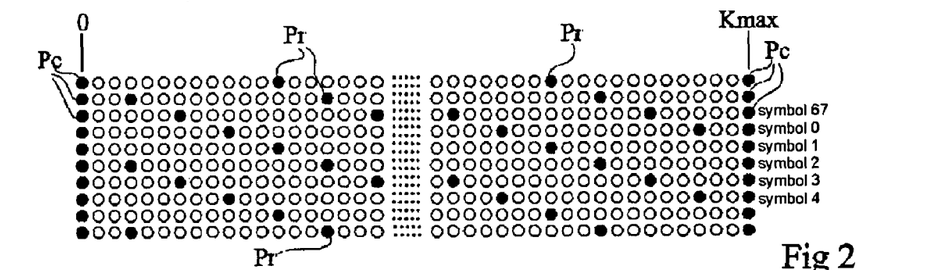
FIG. 2, previously described, schematically shows the position of pilots in symbols.

FIG. 2 schematically shows the place of pilots in the symbols. The symbols are gathered in frames of 68 symbols, as conventional in digital television radio transmission (ETSI standard EN 300 744, V1.4.1). In FIG. 2, each line represents a symbol and each box represents the position of a carrier. The carriers are defined as going from a position 0 to a position N−1.

The pilots, represented by black disks, are of two types. First, each symbol comprises continuous pilots Pc. Continuous pilots correspond to specific frequencies distributed in the channel. In the above-mentioned ETSI standard, there are 45 in 2K mode and 177 in 8K mode. Continuous pilots are present in all symbols and always occupy the same frequency position. In FIG. 2, only the continuous pilots corresponding to positions 0 and N−1 have been shown. Besides, each symbol comprises so-called "scattered" pilots Pr, which are arranged every 12 carriers, and shifted by three positions between two successive symbols. Thus, every four symbols, the same arrangement of scattered pilots Pr can be found. The other carriers, represented by white disks, convey the actual desired signal and will be called wanted carriers hereafter. As appears in FIG. 2, for first frequency positions, the associated carriers always correspond to desired carriers whatever the considered symbol, while for second frequency positions, the associated carriers correspond to desired carriers or to scattered pilots according to the considered symbol. The first positions will be called desired carrier positions hereafter. The second positions will be called scattered pilot positions hereafter.

In the symbol transmission, each symbol is preceded by a guard interval which generally is a copy of a portion of the end of the corresponding symbol. Guard intervals are often defined by a fraction of useful duration Tu. Conventional values of the guard interval are Tu/32, Tu/16, Tu/8, or Tu/4. The guard intervals are used to avoid inter-symbol modulation distortions caused by an echo on transmission.

If the pulse response of the channel is shorter than the length of the guard interval and if the channel does not vary or only slightly varies during the transmission of a symbol, it can be considered that the transmission channel is equivalent to N parallel multiplicative channels. Thereby, calling $X_{n,k}$ the complex coefficient associated with the carrier of position k of the symbol of index n and $Y_{n,k}$ the complex coefficient obtained after application of the fast Fourier transform to the received symbol, one can then write:

$$Y_{n,k} = H_{n,k} X_{n,k} + B_{n,k} \qquad \text{equation (1)}$$

where $H_{n,k}$ is the transfer function of the transmission channel for the carrier of position k of the symbol of index n, and $B_{n,k}$ is the noise due to the transmission channel. Each transmitted complex coefficient is thus multiplied by the corresponding channel transfer function which only depends on the considered symbol and carrier.

At the receiver level, the transmitted complex coefficient associated with each carrier is estimated. Note $\hat{X}_{n,k}$ the estimate of coefficient $X_{n,k}$. To determine $\hat{X}_{n,k}$, it is first necessary to estimate transfer function $H_{n,k}$ of the channel for the carrier of position k of the symbol of index n. Call $\hat{H}_{n,k}$ the estimate of transfer function $H_{n,k}$ of the transmit channel for the carrier of position k of the symbol of index n, or the estimate of the channel of the carrier of position k of the symbol of index n. Estimate $\hat{X}_{n,k}$ is then determined as follows:

$$\hat{X}_{n,k} = \Im(\hat{H}_{n,k}) Y_{n,k} \qquad \text{equation (2)}$$

where $\Im$ is a function, for example, the inverse function, equation (2) then corresponding to the following equation:

$$\hat{X}_{n,k} = \frac{Y_{n,k}}{\hat{H}_{n,k}} = \frac{H_{n,k}}{\hat{H}_{n,k}} X_{n,k} + \frac{B_{n,k}}{\hat{H}_{n,k}} \qquad \text{equation (3)}$$

It is thus necessary to determine as accurately as possible an estimate of channel $\hat{H}_{n,k}$. For a pilot, a simple way to determine the channel estimate is to divide the received complex coefficient by the transmitted complex coefficient. Indeed, the transmitted complex coefficient is known for pilots. Such an estimate, called $\tilde{H}_{n,k}$ is obtained as follows:

$$\tilde{H}_{n,k} = \frac{Y_{n,k}}{X_{n,k}} = H_{n,k} + \frac{B_{n,k}}{X_{n,k}} \qquad \text{equation (4)}$$

Such a channel estimate is called noisy channel estimate since it generally comprises a significant noise component.

After having determined, for a given symbol, the noisy channel estimates of the continuous and scattered pilots, it is necessary to determine the channel estimates of the other symbol carriers which do not correspond to continuous or scattered pilots, that is, desired carriers.

If the transfer function of the channel did not substantially vary according to frequency, the channel estimates of the desired carriers of a symbol could be determined by calculating the average of the noisy channel estimates of the symbol pilots. However, generally, the channel transfer function varies according to frequency and to time and an adapted method for determining the channel estimates of the desired carriers must be implemented. A method example comprises using a two-dimensional Wiener filter. In this case, the channel estimate of a desired carrier of a given symbol corresponds to a combination of the channel estimates of carriers of the same symbol and of several symbols close to the considered symbol.

Such a method is of complex implementation. A simpler method comprises separating the two-dimensional filtering operation into two one-dimensional filtering operations, a first filtering operation performed, for a given carrier position, over several symbols, and a second filtering operation performed, for a given symbol, over several carriers of the symbol.

More specifically, the method for determining the channel estimates of the carriers of a given symbol then comprises the two following successive steps:

(a) a time interpolation step which comprises, for each desired carrier of the given symbol at a scattered pilot position, determining the carrier channel estimate by interpolation based on the noisy channel estimates of scattered pilots of other symbols at the same frequency position; and (b) a frequency interpolation step which comprises, for the given symbol, and for each desired carrier at a desired carrier position, determining the carrier channel estimate by interpolation based on the channel estimates of the symbol carriers determined at the preceding step.

The noisy channel estimates of the continuous and scattered pilots of the given symbol are generally determined along the processing of the given symbol at step (a).

A time interpolation method is thus implemented at step (a), for a given symbol, performed independently for each frequency carrier position. For the symbol being decoded or current symbol, the time interpolation comprises performing a linear combination of noisy channel estimates of carriers at the same frequency position of several symbols received before the current symbol, or past symbols, and of one or several symbols received after the current symbol, or future symbols.

Figure 3:
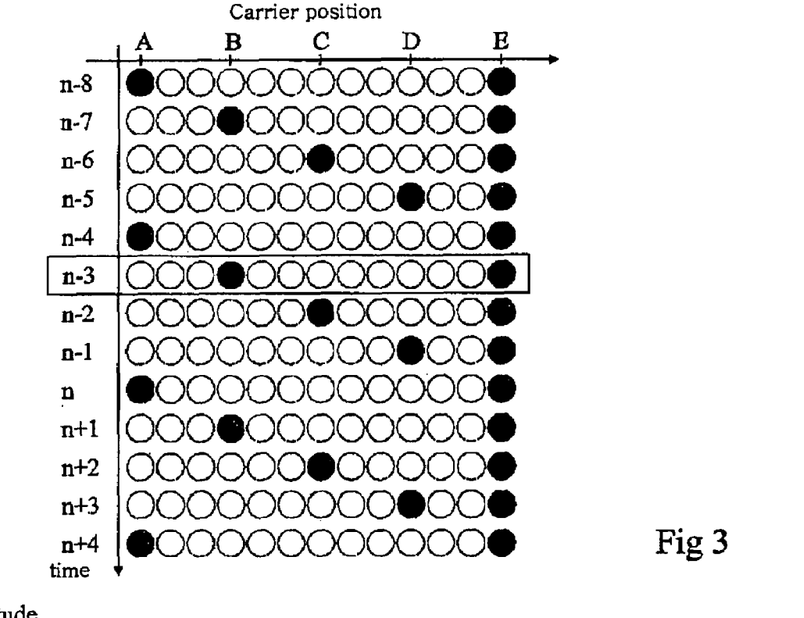
FIGS. 3 and 4, previously described, illustrate the principle of determination of channel estimates.

FIG. 3 is a detailed view of a portion of FIG. 2. Successive frequency positions of scattered pilots are called A, B, C, D and the position of a continuous pilot is called E. For a time interpolation method for which the determination of the channel estimate of a useful symbol at a scattered pilot position uses a single noisy channel estimate of a future symbol, the determination of the channel estimates of all the desired carriers at positions of scattered pilots of a given current symbol requires at least for the next three future symbols to be known. In other words, if the last symbol received by the demodulator is the symbol of index n, the time interpolation method is implemented for the symbol of index n−3 when a single noisy channel estimate of a future symbol is used and, more generally, the symbol of index n−4s+1, where s is an integer, when the noisy estimates of s future symbols are used.

Such a time interpolation method is implemented as follows:

for the carrier at position E which corresponds to a continuous pilot and for the carrier at position B which corresponds to a scattered pilot, the channel estimate is, for example, equal to the noisy channel estimate or may correspond to the result of a time filtering of noisy channel estimates of continuous or scattered pilots; and for the wanted carriers at positions A, C, and D, the channel estimate is determined from the noisy channel estimate of a scattered pilot of a future symbol (that is, for positions A, C, and D, from the noisy channel estimate of same position respectively corresponding to the symbol of index n, n−2 and n−1) and on the noisy channel estimates of scattered pilots of same past symbol position.

Call $U_{n,k}$ a complex vector of dimension M+1, having each component corresponding to a noisy channel estimate. Vector $U_{n,k}$ is provided, for a carrier corresponding to a pilot of the symbol of index n at position k, by the following relation:

$$U_{n,k} = \begin{bmatrix} \tilde{H}_{n-4M,k} \\ \tilde{H}_{n-4(M-1),k} \\ \vdots \\ \tilde{H}_{n-4,k} \\ \tilde{H}_{n,k} \end{bmatrix} \quad \text{equation (5)}$$

where M is an integer, for example, equal to 5.

Conventionally, channel estimates $\hat{H}_{n-1,k}$, $\hat{H}_{n-2,k}$, and $\hat{H}_{n-3,k}$ of useful pilots are obtained by linear combination of the components of vector $U_{n,k}$ and are given by the following equations:

$$\hat{H}_{n-1,k} = \theta_1^T U_{n,k} \quad \text{equation (6)}$$

$$\hat{H}_{n-2,k} = \theta_2^T U_{n,k} \quad \text{equation (7)}$$

$$\hat{H}_{n-3,k} = \theta_3^T U_{n,k} \quad \text{equation (8)}$$

where $\theta_1$, $\theta_2$, and $\theta_3$ are vectors with complex coefficients of dimension M+1, called interpolation filters hereafter, and where $\theta_i^T$, i being an integer ranging between 1 and 3, corresponds to the transpose of $\theta_i$.

Figure 4:
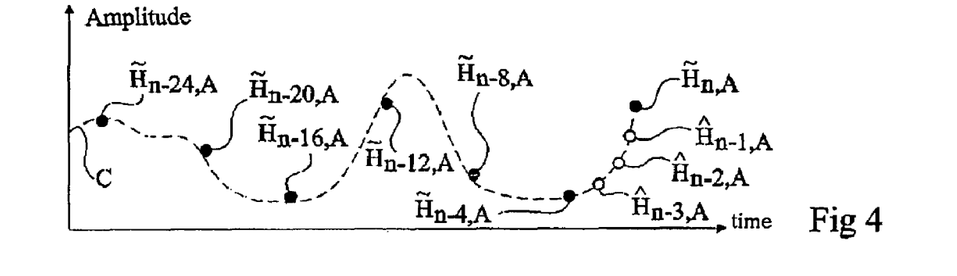

FIG. 4 shows a curve C in dotted lines of the amplitude of the transfer function of the transmission channel for frequency position A. Black disks $\tilde{H}_{n-24,A}$, $\tilde{H}_{n-20,A}$, $\tilde{H}_{n-16,A}$, $\tilde{H}_{n-12,A}$, $\tilde{H}_{n-8,A}$, $\tilde{H}_{n-4,A}$, and $\tilde{H}_{n,A}$ correspond to the noisy channel estimates of scattered pilots which have been obtained, for example, from equation (4). White disks $\hat{H}_{n-1,A}$, $\hat{H}_{n-2,A}$, and $\hat{H}_{n-3,A}$ correspond to the channel estimates of useful pilots which are to be determined. Each channel estimate $\hat{H}_{n-1,A}$, $\hat{H}_{n-2,A}$, and $\hat{H}_{n-3,A}$ is then equal to a specific linear combination of six noisy channel estimates $\tilde{H}_{n-20,A}$, $\tilde{H}_{n-16,A}$, $\tilde{H}_{n-12,A}$, $\tilde{H}_{n-8,A}$, $\tilde{H}_{n-4,A}$, and $\tilde{H}_{n,A}$.

Theoretically, the statistic properties of the transmission channel are substantially independent from frequency. This means that even if the amplitude of the channel transfer function may be different for each carrier of a given symbol, the absolute value of the variation rate of the transfer function is independent from frequency. For a given symbol, interpolation filters $\theta_1$, $\theta_2$, and $\theta_3$ thus do not depend on the frequency position of the carriers. The interpolation filters can be determined only for the continuous pilots and be used to determine the channel estimates of the other symbol carriers. Conversely, the statistic properties of the transmission channel may vary along time, in particular when the receiver is mobile. It is thus necessary to determine new values of interpolation filters $\theta_1$, $\theta_2$, and $\theta_3$, for example, for each symbol.

Interpolation filters $\theta_1$, $\theta_2$, and $\theta_3$ can be determined by an iterative method. Thereby, if rank p is assigned to the last determined value of filter $\theta_i$, i ranging between 1 and 3, a new value of filter $\theta_i$ corresponds to rank p+1 and is provided by the following relation:

$$\theta_i(p+1)=f(\theta_i(p)) \quad \text{equation (9)}$$

where f is an iteration function. New values of filter $\theta_i$ may be determined on implementation of the time interpolation method for each continuous pilot of a symbol, and this, for example, for each symbol.

A constraint of the implementation of an iterative method is that iteration function f needs to have a fast convergence of the value of filter $\theta_i$.

A disadvantage of the previously-described time interpolation method which performs a linear combination of past and future noisy channel estimates is that the obtained accuracy may be insufficient. Such may be the case when the amplitude of the transmission channel transfer function varies significantly along time, which occurs, for example, when the receiver is mobile.

SUMMARY OF THE INVENTION

The present invention aims at overcoming all or part of the disadvantages of known methods for determining estimates of the transfer function of the transmission channel.

The present invention more specifically aims at a time interpolation method which enables determining estimates of the transfer function of the transmission channel with an improved accuracy.

According to another object of the present invention, the present invention aims at a time interpolation method using interpolation filters determined by an iterative method which enables having the components of the interpolation filters rapidly converge towards values representative of the properties of the transmission channel.

To achieve all or part of these objects as well as others, embodiments of the present invention provide a method of COFDM demodulation of successive symbols of a signal received from a transmission channel, each symbol comprising first carriers modulated in phase and/or in amplitude conveying data which depend on the symbol and second reference carriers called pilots having their frequency positions varying at least partly from one symbol to the next symbol, at least one given carrier from among the second carriers corresponding, for each symbol, to the same pilot, the method comprising, for each symbol, a step of determining a first estimate of the transfer function of the channel for each carrier in a first set of carriers from among the first carriers of said symbol such that, for the frequency positions of the considered carriers, symbols different from said symbol comprise pilots, corresponding to a linear combination of second estimates of the transfer function of the channel determined for pilots at the frequency of said carrier. The coefficients of the linear combination are determined in iterative fashion, a new value of at least one of the coefficients being equal to the sum of the last determined value of said coefficient and of a term comprising the product between an iteration step and an error term equal to the different between the second estimate determined for said given carrier of a symbol, which depends on the coefficient, and the first estimate determined for said given carrier of said symbol, the iteration step being determined in iterative fashion.

According to an embodiment of the present invention, each second estimate determined for a symbol carrier is equal to the ratio between a received coefficient associated with the carrier and a predetermined theoretical coefficient associated with the carrier.

According to an embodiment of the present invention, the first estimate is determined based on at least the second estimate determined for a pilot at the same frequency as said carrier of a symbol received after said symbol.

According to an embodiment of the present invention, the new value of the coefficient is equal to the sum of the last determined value of said coefficient and of a term equal to the product of the iteration step, of the error term, and of the conjugate of the second estimate determined for the given carrier of a symbol which depends on the coefficient.

According to an embodiment of the present the method comprises the steps, for at least the given carrier of each symbol, of determining a vector having at least some components corresponding to second estimates determined for the given carrier of symbols received before said symbol; and determining a new value of the iteration step equal to the sum of the last determined value of the iteration step and of a term equal to the product of a constant term and of the real part of the product of the transpose of the vector, of a weighting array, and of the conjugate of the error term.

The present invention also provides a COFDM demodulator intended to receive successive symbols of a signal received from a transmission channel, each symbol comprising first carriers modulated in phase and/or in amplitude conveying data which depend on the symbol and second reference carriers called pilots, having their frequency positions varying at least partly from one symbol to the next symbol, at least one given carrier from among the second carriers corresponding, for each symbol, to the same pilot, the demodulator comprising a circuit for determining, for each symbol, a first estimate of the transfer function of the channel for each carrier in a first set of carriers from among the first carriers of said symbol such that, for the frequency positions of the considered carriers, symbols different from said symbol comprise pilots, corresponding to a linear combination of second estimates of the transfer function of the channel determined for pilots at the frequency of said carrier. The demodulator comprises a circuit for determining in iterative fashion coefficients of the linear combination, a new value of at least one of the coefficients being equal to the sum of the last determined value of said coefficient and of a term comprising the product between an iteration step and an error term equal to the different between the second estimate determined for said given carrier of a symbol which depends on the coefficient and the first estimate determined for said given carrier of said symbol, the demodulator further comprising a circuit for determining in iterative fashion the iteration step.

According to an embodiment of the present invention, the demodulator comprises a circuit capable of providing each second estimate for a carrier of a symbol as being equal to the ratio between a received coefficient associated with the carrier and a predetermined theoretical coefficient associated with the carrier.

According to an embodiment of the present invention, the circuit for determining the coefficients of the linear combination is capable of providing the new value of the coefficient as being equal to the sum of the last determined value of said coefficient and of a term equal to the product of the iteration step, of the error term, and of the conjugate of the second estimate determined for the given carrier of a symbol which depends on the coefficient.

According to an embodiment of the present invention, the circuit for determining the iteration step comprises a circuit capable, for at least the given carrier of each symbol, of determining a vector having at least some components corresponding to second estimates determined for the given carrier of symbols received before said symbol; and a circuit capable of determining a new value of the iteration step equal to the sum of the last determined value of the iteration step and of a term equal to the product of a constant term and of the real part of the product of the transpose of the vector, of a weighting array, and of the conjugate of the error term.

According to an embodiment of the present invention, the circuit for determining the iteration step comprises a circuit capable of determining a new value of the weighting array equal to the sum of the last determined value of the weighting array, of a first term equal to the product of the error term, and of the conjugate of the vector and of a second term equal to the product of the opposite of the iteration step, of the conjugate of the vector, of the transpose of the vector, and of the last determined value of the weighting array.

The foregoing and other objects, features, and advantages of the present invention will be discussed in detail in the following non-limiting description of specific embodiments in connection with the accompanying drawings.

DETAILED DESCRIPTION

For clarity, the same elements have been designated with the same reference numerals in the different drawings.

Figure 5:
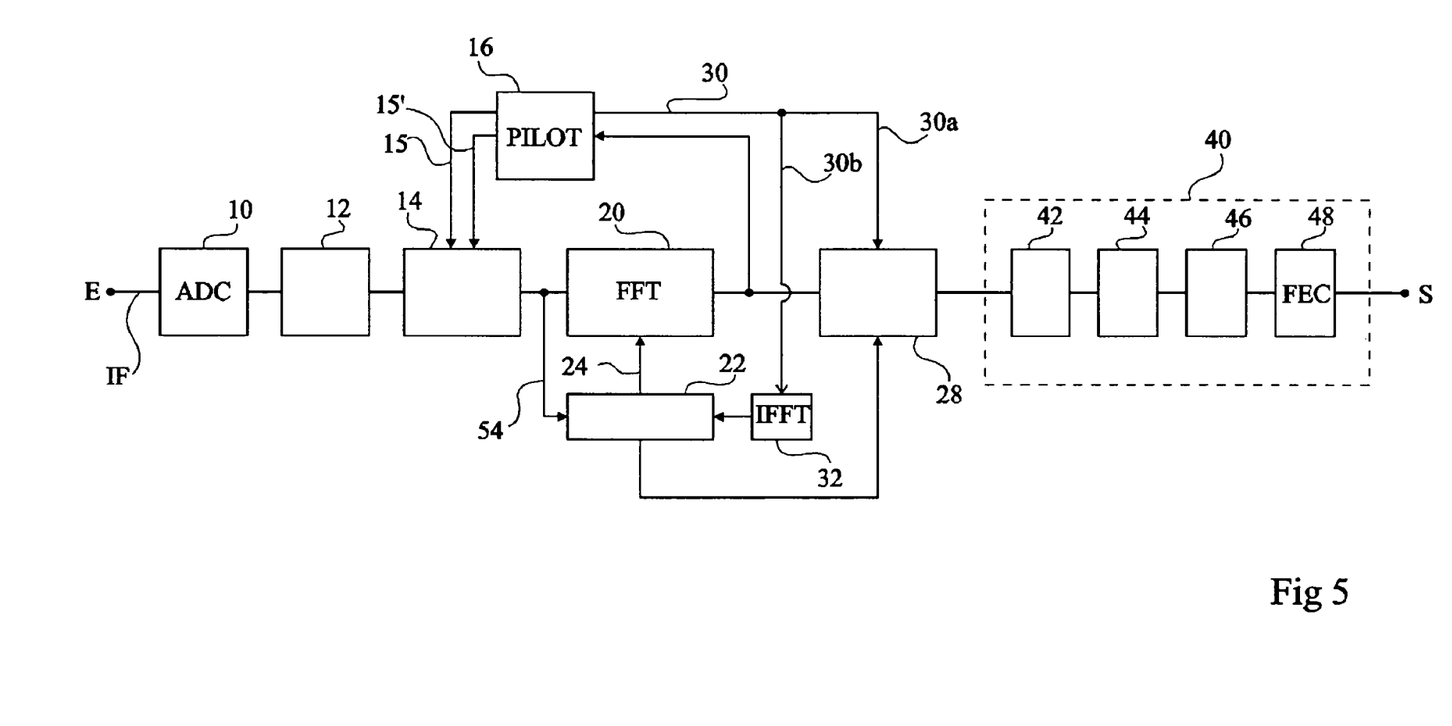
FIG. 5 shows an example of a COFDM demodulator according to the present invention.

FIG. 5 shows an example of a COFDM demodulator of a receiver according to the present invention. An input E of the demodulator receives a signal IF of intermediary frequency enabling sampling, for example, at 36 MHz. Signal IF corresponds to the signal received after various frequency changes or transpositions.

Input E is coupled to an analog-to-digital converter 10 (ADC) which digitizes input signal IF. Analog-to-digital converter 10 drives a frequency-change unit 12. Unit 12 provides a signal substantially in baseband, the spectrum of the signal at the output of unit 12 being centered on a frequency substantially equal to zero. Unit 12 is coupled to a unit 14 enabling on the one hand fine setting of the central frequency of the signal spectrum and, on the other hand, provision of time samples at appropriate times of the subsequent processing. At the output of unit 14, the signal spectrum is centered on a frequency equal to 0 and the number and the time position of the samples are adapted to the transformation by Fourier transform which occurs in the next unit. Unit 14 is controlled by connections 15 and 15' connecting unit 14 to a unit 16 for processing the continuous and scattered pilots.

The output of unit 14 drives a fast Fourier transform unit 20 (FFT) which provides the frequencies correspond to a symbol. Unit 20 is driven by a unit 22 which provides, via a connection 24, a signal for setting the analysis window of the Fourier transform.

The output of unit 20 is coupled to unit 16 which performs the extraction and the processing of the continuous and scattered pilots. Unit 16 provides over connections 15 and 15' the signals intended to correct the central spectrum frequency and the signal sampling frequency.

The output of unit 20 drives a unit 28 in which the signal is corrected by means of an estimate of the frequency response of the channel, that is, the estimate of the channel transfer function. The estimate of the channel transfer function is obtained in unit 16 by means of the pilots. This estimate is provided by unit 16 over a connection 30, having a branch 30$a$ coupled to unit 28. At the output of unit 28, the signal comprises the carriers conveying the data.

The estimate of the channel transfer function provided by unit 16 supplies, via connection 30 and a branch 30$b$ of connection 30, an inverse fast Fourier transform unit 32 (IFFT), to determine the pulse response of the channel. Unit 32 provides the pulse response of the channel to unit 22, to dynamically adjust the positioning of the FFT analysis window.

The processing of the desired carriers is ensured in a data processing and supply circuit 40. Circuit 40 has a conventional structure and may comprise, as shown in FIG. 5, a symbol desinterlacing unit 42, a so-called "demapping" unit 44, a bit desinterlacing unit 46, and an error-correction unit 48 (FEC). The output of unit 48 forms output S of circuit 40 and of the demodulator and provides data corresponding to the transmitted data.

For each symbol, the time interpolation method according to the present invention is implemented by unit 16. The method comprises steps of determination of new values of interpolation filters $\theta_i$, with i ranging between 1 and 3, each time the carrier processed by unit 16 corresponds to a continuous pilot.

Figure 6:
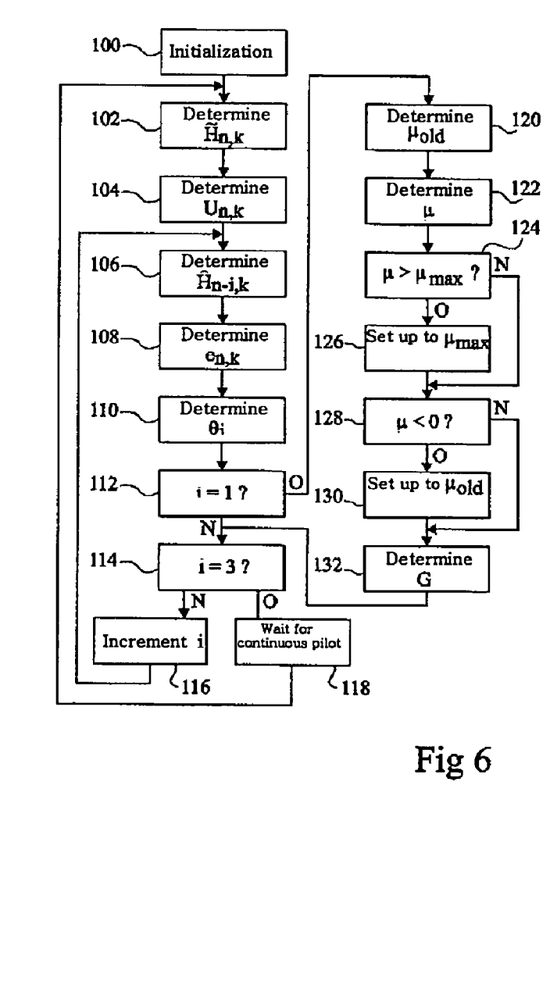
FIG. 6 illustrates the steps of determination of the interpolation filters implemented by a first example of a time interpolation method according to the present invention.

FIG. 6 illustrates the steps of determination of interpolation filters $\theta_i(p)$, with i ranging between 1 and 3, implemented by a first example of a time interpolation method according to the present invention.

At step 100, the vectors, matrixes, and parameters used by the iterative method are initialized. As an example, each filter $\theta_i(0)$, with i ranging between 1 and 3, is initialized as follows:

$$\theta_i(0)=(\tfrac{1}{6}, \ldots, \tfrac{1}{6})^T \qquad \text{equation (10)}$$

The iterative method uses a vector G of dimension M+1 which is modified along the method at the same time as filter $\theta_1(p)$. Time index p is thus also used for vector G. Vector G is initialized as follows:

$$G(0)=(0, \ldots, 0)^T \qquad \text{equation (11)}$$

The method uses scalar parameters $\mu_{max}$ and $\alpha$ which are respectively set, for example, to value 0.2 and $\mu_{max}/300$. The method uses a scalar parameter $\mu$ which is modified along the method at the same time as vector G. Time index p is thus also used for parameter $\mu$. Parameter $\mu$ is initialized as follows:

$$\mu(0)=\mu_{max} \qquad \text{equation (12)}$$

Index i is initially set to 1. The method carries on at step 102 when unit 16 has received enough symbols to determine vector $U_{n,k}$, at least 4M+1 symbols in the first embodiment. However, the method may also be implemented when less than 4M+1 symbols are received. In this case, vector $U_{n,k}$ may be completed with determined initial values.

At step 102, a noisy channel estimate $\tilde{H}_{n,k}$ of the continuous pilot of the symbol of index n at position k is determined based on equation (4). The method carries on at step 104.

At step 104, vector $U_{n,k}$ is determined based on equation (5). The method carries on at step 106.

At step 106, channel estimate $\hat{H}_{n-i,k}$ of the continuous pilot of the symbol of index n–i at position k is determined based on one of equations (6), (7), or (8) according to the value of index i. The method carries on at step 108.

At step 108, an estimate error $e_{n,k}$ is determined according to the following equation:

$$e_{n,k} = \tilde{H}_{n-i,k} - \hat{H}_{n-i,k} \qquad \text{equation (13)},$$

vector $\tilde{H}_{n-i,k}$ having been determined at a former cycle of the iterative method. The method carries on at step 110.

At step 110, a new value $\theta_i(p+1)$ of interpolation filter $\theta_i$ according to the following equation is determined:

$$\theta_i(p+1) = \theta_i(p) + \mu(p) U_{n,k}^H e_{n,k} \qquad \text{equation (14)}$$

where $U_{n,k}^H$ corresponds to the transposed conjugate of vector $U_{n,k}$. Parameter $\mu(p)$ thus corresponds to the step of the iterative method. The method carries on at step 112.

At step 112, it is determined whether index i is equal to 1. If not, the method carries on at step 114.

At step 114, it is determined whether index i is equal to 3. If not, the method carries on at step 116.

At step 116, index i is increased by one unit and the process resumes at step 106.

If, at step 114, index i is equal to 3, the method carries on at step 118.

At step 118, the next continuous pilot of the symbol of index n or the first continuous pilot of the symbol of index n+1 are awaited. Index i is set to 1. The method carries on at step 102.

If, at step 112, i is equal to 1, the method carries on at step 120.

At step 120, parameter $\mu_{old}$ is modified as follows:

$$\mu_{old} = \mu(p) \qquad \text{equation (15)}$$

The method carries on at step 122.

At step 122, a new value $\mu(p+1)$ of parameter $\mu$ is determined according to the following relation:

$$\mu(p+1) = \mu(p) + \alpha \Re(U_{n,k}^T G(p) e_{n,k}^*) \qquad \text{equation (16)}$$

where $e_{n,k}^*$ corresponds to the conjugate of $e_{n,k}$, $\Re(U_{n,k}^T G(p) e_{n,k}^*)$ corresponds to the real part of $U_{n,k}^T G(p) e_{n,k}^*$. The method carries on at step 124.

At step 124, $\mu(p+1)$ is compared with $\mu_{max}$. If $\mu(p+1)$ is greater than $\mu_{max}$, the method carries on at step 126.

At step 126, $\mu(p+1)$ is set to $\mu_{max}$. The method carries on at step 128. If, at step 124, $\mu(p+1)$ is lower than $\mu_{max}$, the method carries on at step 128.

At step 128, it is determined whether $\mu(p+1)$ is smaller than 0. If so, the method carries on at step 130.

At step 130, $\mu(p+1)$ is set to $\mu_{old}$. The method carries on at step 132.

If at step 128, $\mu p(p+1)$ is greater than 0, the method carries on at step 132.

At step 132, a new value $G(p+1)$ of vector G is determined as follows:

$$G(p+1) = G(p) - \mu(p+1) U_{n,k}^* U_{n,k}^T G(p) + U_{n,k}^* e_{n,k} \qquad \text{equation (17)}$$

The method carries on at step 114.

The fact of modifying, at steps 120 to 132, step μ used for the determination of interpolation filters $\theta_i$, with i ranging between 1 and 3, enables having the method for determining interpolation filters $\theta_i$ converge much more rapidly than with a method in which step μ would be fixed. The iterative method according to the present invention is then relatively little sensitive to the initial values used for interpolation filters $\theta_i$.

Figure 7:
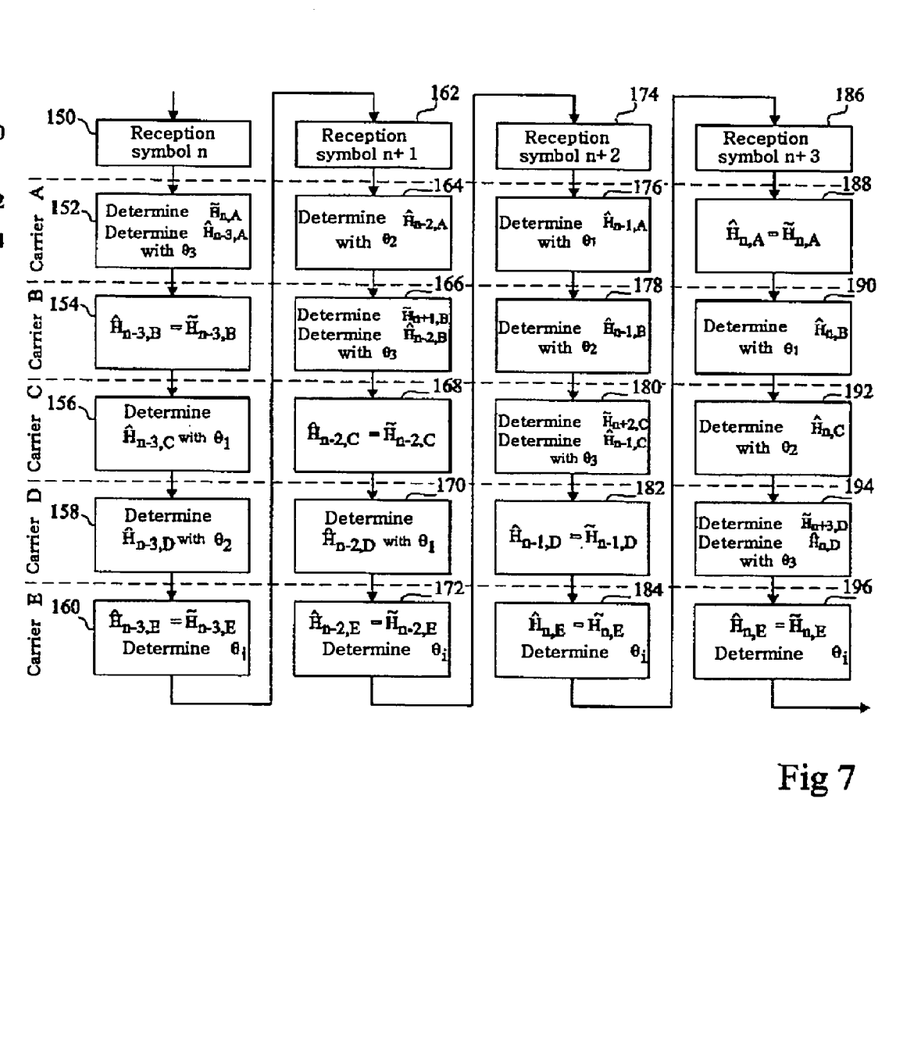
FIG. 7 illustrates the steps of the first example of a time interpolation method according to the present invention.

FIG. 7 shows the steps of the first example of time interpolation method implemented by unit 16. The method will be described in relation with FIG. 3.

It is assumed that the symbols up to the symbol of index n−1 have already been received by unit 16.

At step 150, unit 16 receives the symbol of index n and extracts therefrom the continuous and scattered pilots. The determination of the channel estimates will then be performed for the symbol of index n−3. It is then carried on by considering the carrier at position A at step 152.

At step 152, since the carrier at position A of the symbol of index n corresponds to a scattered pilot, noisy channel estimate $\tilde{H}_{n,A}$ is determined based on equation (4). Value $\tilde{H}_{n,A}$ is then stored. Further, for the symbol of index n−3, channel estimate $\hat{H}_{n-3,A}$ is determined by using $\theta_3$ according to the following relation which can be deduced from equation (8):

$$\hat{H}_{n-3,A} = \theta_3^T U_{n,A} \qquad \text{equation (18)}$$

It is then carried on by considering the carrier at position B at step 154.

At step 154, channel estimate $\hat{H}_{n-3,B}$ of the carrier at position B is equal to the noisy channel estimate $\tilde{H}_{n-3,B}$ which has been formerly determined. It is then carried on, considering the carrier at position C, at step 156.

At step 156, channel estimate $\hat{H}_{n-3,C}$ is determined by using $\theta_1$ according to the following relation which can be deduced from equation (6):

$$\hat{H}_{n-3,C} = \theta_1^T U_{n-2,C} \qquad \text{equation (19)}$$

It is then carried on by considering the carrier at position D at step 158.

At step 158, channel estimate $\hat{H}_{n-3,D}$ is determined by using $\theta_2$ according to the following relation which can be deduced from equation (7):

$$\hat{H}_{n-3,D} = \theta_2^T U_{n-1,D} \qquad \text{equation (20)}$$

It is then carried on by considering the carrier at position E at step 160.

At step 160, channel estimate $\hat{H}_{n-3,E}$ of the carrier at position E is equal to noisy channel estimate $\tilde{H}_{n-3,E}$. New values of interpolation filters $\theta_1$, $\theta_2$, and $\theta_3$ are determined by the method previously described in relation with FIG. 6. The present method can be carried on for all the carriers of symbol n−3 corresponding to continuous pilots, scattered pilots, or desired carriers at scattered pilot positions. Indeed, the succession of steps 152, 154, 156, and 158 and occasionally step 160 can always be found. When all the carriers of the symbol of index n−3 have been considered, the method carries on at step 162.

At step 162, unit 16 receives the symbol of index n+1 and extracts therefrom the continuous and scattered pilots. The determination of the channel estimates will thus be performed for the symbol of index n−2. It is then carried on by considering the carrier at position A at step 164.

At step 164, channel estimate $\hat{H}_{n-2,A}$ is determined by using $\theta_2$ according to the following relation which can be deduced from equation (7):

$$\hat{H}_{n-2,A} = \theta_2^T U_{n,A} \qquad \text{equation (21)}$$

It is then carried on by considering the carrier at position B at step 166.

At step 166, since the carrier at position B of the symbol of index n+1 corresponds to a scattered pilot, noisy channel estimate $\tilde{H}_{n+1,B}$ is determined based on equation (4). Value $\tilde{H}_{n+1,B}$ is then stored. Further, for the symbol of index n−2, channel estimate $\hat{H}_{n-2,B}$ is determined by using $\theta_3$ according to the following relation which can be deduced from equation (8):

$$\hat{H}_{n-2,B}=\theta_3{}^T U_{n+1,B} \qquad \text{equation (22)}$$

It is then carried on by considering the carrier at position C at step 168.

At step 168, channel estimate $\hat{H}_{n-2,C}$ of the carrier at position C is equal to noisy channel estimate $\tilde{H}_{n-2,C}$ which has been formerly determined. It is then carried on by considering the carrier at position D at step 170.

At step 170, channel estimate $\hat{H}_{n-2,D}$ is determined by using $\theta_1$ according to the following relation which can be deduced from equation (6):

$$\hat{H}_{n-2,D}=\theta_1{}^T U_{n-1,D} \qquad \text{equation (23)}$$

It is then carried on by considering the carrier at position E at step 172.

At step 172, channel estimate $\hat{H}_{n-2,E}$ of the carrier at position E is equal to noisy channel estimate $\tilde{H}_{n-2,E}$. New values of interpolation filters $\theta_1$, $\theta_2$, and $\theta_3$ are determined by the method previously described in relation with FIG. 6. The present method can be carried on for all the carriers of symbol n−2 corresponding to continuous pilots, scattered pilots, or wanted carriers at scattered pilot positions. Indeed, the succession of steps 164, 166, 168, and 170 are always found with, occasionally, step 172. When all the carriers of the symbol of index n−2 have been considered, the method carries on at step 174.

At step 174, unit 16 receives the symbol of index n+2 and extracts the continuous and scattered pilots therefrom. The determination of the channel estimates will thus be performed for the symbol of index n−1. It is then carried on by considering the carrier at position A at step 176.

At step 176, channel estimate $\hat{H}_{n-1,A}$ is determined by using $\theta_1$ according to the following relation, which can be deduced from equation (6):

$$\hat{H}_{n-1,A}=\theta_1{}^T U_{n,A} \qquad \text{equation (24)}$$

It is then carried on by considering the carrier at position B at step 178.

At step 178, channel estimate $\hat{H}_{n-1,B}$ is determined by using $\theta_2$ according to the following relation which can be deduced from equation (7):

$$\hat{H}_{n-1,B}=\theta_2{}^T U_{n+1,B} \qquad \text{equation (25)}$$

It is then carried on by considering the carrier at position C at step 180.

At step 180, since the carrier at position C of the symbol of index n+2 corresponds to a scattered pilot, noisy channel estimate $\tilde{H}_{n-2,C}$ is determined based on equation (4). Value $\tilde{H}_{n-2,C}$ is then stored. Further, for the symbol of index n−1, channel estimate $\hat{H}_{n-1,C}$ is determined by using $\theta_3$ according to the following relation which can be deduced from equation (8):

$$\hat{H}_{n-1,C}=\theta_3{}^T U_{n+2,C} \qquad \text{equation (26)}$$

It is then carried on by considering the carrier at position D at step 182.

At step 182, channel estimate $\hat{H}_{n-1,D}$ of the carrier at position D is equal to noisy channel estimate $\tilde{H}_{n-1,D}$ which has been formerly determined. It is then carried on by considering the carrier at position E at step 184.

At step 184, channel estimate $\hat{H}_{n-1,E}$ of the carrier at position E is equal to noisy channel estimate $\tilde{H}_{n-1,E}$. New values of interpolation filters $\theta_1$, $\theta_2$, and $\theta_3$ are determined by the method previously described in relation with FIG. 6. The present method can be carried on for all the carriers of symbol n−1 corresponding to continuous pilots, scattered pilots, or desired carriers at scattered pilot positions. Indeed, the succession of steps 176, 178, 180, and 182 can always be found with, occasionally, step 184. When all the carriers of the symbol of index n−1 have been considered, the method carries on at step 186.

At step 186, unit 16 receives the symbol of index n+3 and extracts the continuous and scattered pilots therefrom. The determination of the channel estimates will thus be performed for the symbol of index n. It is then carried on by considering the carrier at position A at step 188.

At step 188, channel estimate $\hat{H}_{n,A}$ of the carrier at position A is equal to noisy channel estimate $\tilde{H}_{n,A}$ which has been formerly determined. It is then carried on by considering the carrier at position B at step 190.

At step 190, channel estimate $\hat{H}_{n,B}$ is determined by using $\theta_1$ according to the following relation which can be deduced from equation (6):

$$\hat{H}_{n,B}=\theta_1{}^T U_{n+1,B} \qquad \text{equation (27)}$$

It is then carried on by considering the carrier at position C at step 192.

At step 192, channel estimate $\hat{H}_{n,C}$ is determined by using $\theta_2$ according to the following relation which can be deduced from equation (7):

$$\hat{H}_{n,C}=\theta_2{}^T U_{n+2,C} \qquad \text{equation (28)}$$

It is then carried on by considering the carrier at position D at step 194.

At step 194, since the carrier at position D of the symbol of index n+3 corresponds to a scattered pilot, noisy channel estimate $\tilde{H}_{n+3,D}$ is determined based on equation (4). Value $\tilde{H}_{n-3,D}$ is then stored. Further, for the symbol of index n, channel estimate $\hat{H}_{n,D}$ is determined by using $\theta_3$ according to the following relation which can be deduced from equation (8):

$$\hat{H}_{n,D}=\theta_3{}^T U_{n+3,D} \qquad \text{equation (29)}$$

It is then carried on by considering the carrier at position E at step 196.

At step 196, channel estimate $\hat{H}_{n,E}$ of the carrier at position E is equal to noisy channel estimate $\tilde{H}_{n,E}$. New values of interpolation filters $\theta_1$, $\theta_2$, and $\theta_3$ are determined by the method previously described in relation with FIG. 6. The present method can be carried on for all the carriers corresponding to continuous pilots, to scattered pilots, or to wanted carriers at scattered pilot positions of symbol n. Indeed, the succession of steps 188, 190, 192, and 194 can always be found with, occasionally, step 196. When all the carriers of the symbol of index n have been considered, the method resumes at step 150 for the processing of the symbol of index n+1 for which the relative position of the scattered pilots is identical to that of the symbol of index n−3.

After implementation of the first example of the method of time interpolation of the channel according to the present invention, the channel estimates for all the carriers corresponding to continuous pilots, scattered pilots, or useful pilots at scattered pilot positions are obtained for a symbol of index n, that is, one channel estimate every three carriers. The channel estimates for the other wanted carriers of the symbol of index n are obtained at the next frequency interpolation step by linear combination of the channel estimates of carriers of the symbol of index n provided by the time interpolation method by using a finite impulse response interpolation filter (FIR).

For a symbol of index n and a carrier at position k, k can be written as k=3r+j, where r is a positive integer, possibly zero, and j is an integer ranging between 0 and 2. The carrier at position r corresponds to a continuous pilot, to a scattered pilot, or to a wanted carriers at a scattered pilot position. Thereby, the channel estimate of the carrier at position r has been provided by the time interpolation method. A vector $Z_{n,r}$ is determined as follows:

$$Z_{n,r} = \begin{bmatrix} \hat{H}_{n,3r-3(P-1)} \\ \hat{H}_{n,3r-3(P-2)} \\ \vdots \\ \hat{H}_{n,3r-3} \\ \hat{H}_{n,3r} \\ \hat{H}_{n,3r+3} \\ \vdots \\ \hat{H}_{n,3r+3(P-1)} \\ \hat{H}_{n,3r+3P} \end{bmatrix} \quad \text{equation (30)}$$

where P is an integer which, in the present embodiment, is taken as equal to 6. Call $$\hat{\hat{H}}_{n,k}$$

the channel estimate of the carrier of the symbol of index n at position k provided at the frequency interpolation step to differentiate it from a channel estimate provided by the time estimation method. Channel estimate $$\hat{\hat{H}}_{n,k}$$

is obtained according to the following relation:

$$\hat{\hat{H}}_{n,k} = \Phi_i^T Z_{n,r} \quad \text{equation (31)}$$

where $\Phi_i$, with i ranging between 0 and 2, is a vector with complex coefficients of dimension 2P which represents the pulse response of the filter used to perform the frequency interpolation. It is, for example, a Wiener filter. Frequency interpolation filters $\Phi_i$, with i ranging between 0 and 2, are determined according to the type of implemented COFDM demodulation (for example, of 2K, 4K, 8K type) and to the duration of the selected pulse response (for example, 5 µs, 20 µs, or 40 µs). For k smaller than 3P−3, the channel estimates used for the determination of $Z_{n,r}$, for which the frequency position would be lower than 0, are replaced with $\hat{H}_{n,0}$. Similarly, for k greater than N−13l 3P, the channel estimates used for the determination of $Z_{n,r}$, for which the frequency position would be greater then N−1, are replaced with $\hat{H}_{n,N-1}$.

At the end of the frequency interpolation step, a channel estimate is available for each carrier of the symbol of index n. It should be noted that, during the frequency interpolation step, the channel estimates of the wanted carriers at scattered pilot positions, which had been previously provided by the time interpolation method, can be determined again at the frequency interpolation step.

According to a second example of time interpolation method, not only future and past noisy channel estimates, but also past wanted carrier channel estimates provided at preceding frequency interpolation steps are used for the determination of the channel estimate of a desired carrier at a scattered pilot position. This enables improving the accuracy of the channel estimates provided by the time interpolation method, and thus the performances of the COFDM demodulation. As an example, in addition to the five past noisy channel estimates and to a future noisy channel estimate used by the first example of time interpolation method, the second example of time interpolation method uses the two wanted carrier channel estimates which come before the considered symbol. As compared with the first time interpolation method example, interpolation filters $\theta_1$, $\theta_2$, and $\theta_3$ are, in the second method example, vectors of dimension 8.

Figure 8:
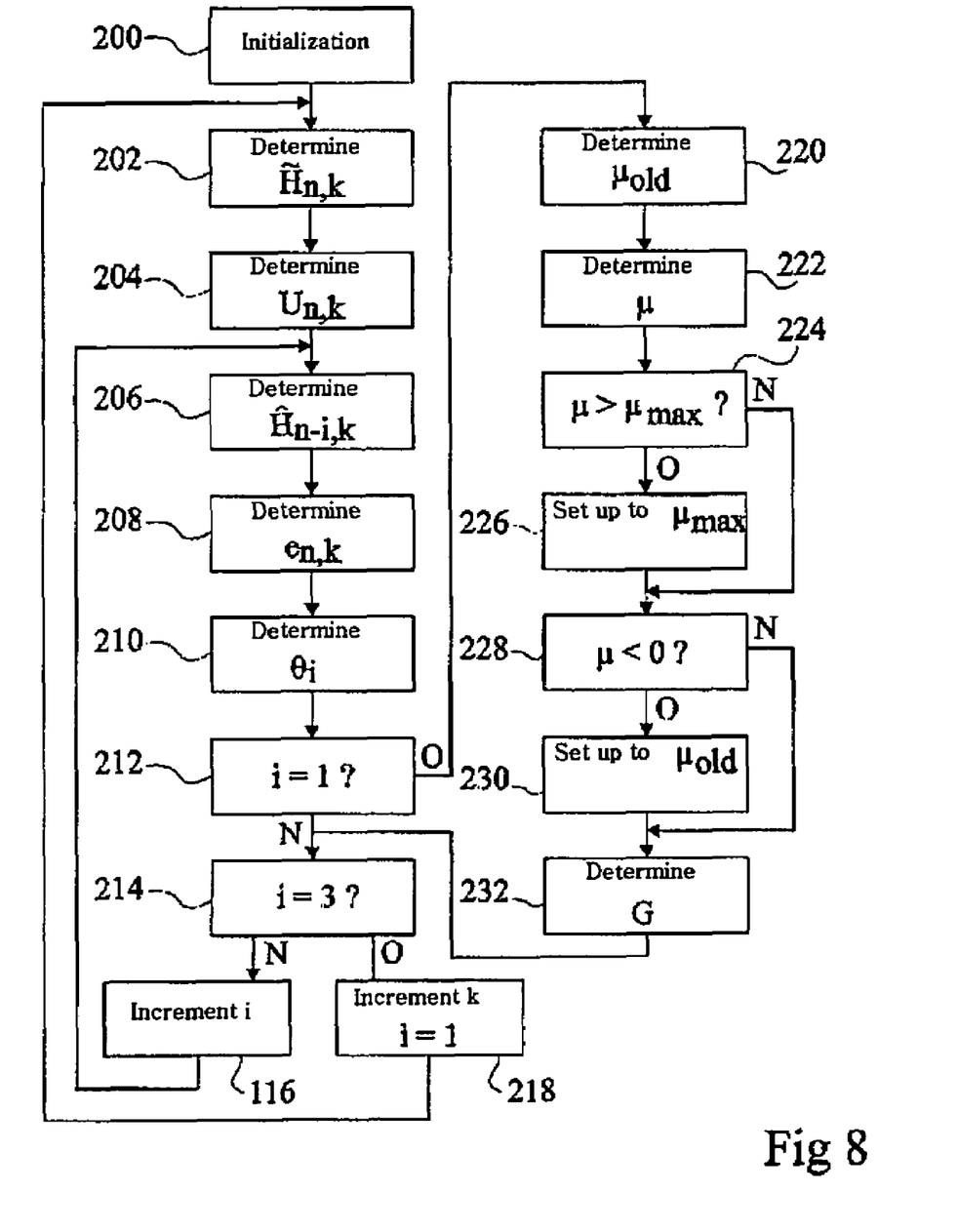
FIG. 8 illustrates the steps of determination of the interpolation filters implemented by a second example of time interpolation method according to the present invention.

FIG. 8 illustrates the steps implemented by the second example of time interpolation method for the determination of interpolation filters $\theta_i(p)$, with i ranging between 1 and 3. Such steps are only implemented when the carrier processed by unit 16 corresponds to a continuous pilot. Only the differences with respect to the steps previously described for the first time interpolation method example and illustrated in FIG. 6 will be described.

At step 200, as compared with step 100, interpolation filters $\theta_i(0)$, for i ranging between 1 and 3, are initialized as follows:

$$\theta_i(0) = (1/8, \ldots, 1/8)^T \quad \text{equation (32)}$$

Further, vector G is, in the second time interpolation method example, a vector of dimension 8 initialized as follows:

$$G(0) = (0, \ldots, 0)^T \quad \text{equation (33)}$$

Step 202 is identical to step 102.

At step 204, as compared with step 104, instead of vector $U_{n,k}$, vector $U_{n,k,i}$ which is determined according to the following relation, is used:

$$U_{n,k,i} = \begin{bmatrix} \tilde{H}_{n-4M,k} \\ \tilde{H}_{n-4(M-1),k} \\ \vdots \\ \tilde{H}_{n-8,k} \\ \tilde{H}_{n-3-i,k} \\ \vdots \\ \tilde{H}_{n-1+i,k} \\ \tilde{H}_{n,k} \end{bmatrix} \quad \text{equation (34)}$$

Steps 206 to 232 are identical to steps 106 to 132 of the first time interpolation method example.

Unlike the first example of time interpolation method, in the second time interpolation method example, after step 216, the method carries on at step 204. Indeed, a new vector $U_{n,k,i}$ must be determined when index i is incremented.

The second example of time interpolation method further comprises the same steps as the first time interpolation method example previously described in relation with FIG. 7. However, instead of equations (6), (7), and (8), the following equations are respectively used:

$$\hat{H}_{n-1,k} = \theta_1^T V_{n,k} \qquad \text{equation (35)}$$

$$\hat{H}_{n-2,k} = \theta_2^T V'_{n,k} \qquad \text{equation (36)}$$

$$\hat{H}_{n-3,k} = \theta_3^T V''_{n,k} \qquad \text{equation (37)}$$

where $V_{n,k}$, $V'_{n,k}$, and $V''_{n,k}$ are vectors of dimensions 8 defined as follows:

$$V_{n,k} = \begin{bmatrix} \tilde{H}_{n-20,k} \\ \tilde{H}_{n-16,k} \\ \tilde{H}_{n-12,k} \\ \tilde{H}_{n-8,k} \\ \tilde{H}_{n-4,k} \\ \hat{H}_{n-3,k} \\ \hat{H}_{n-2,k} \\ \tilde{H}_{n,k} \end{bmatrix} \quad V'_{n,k} = \begin{bmatrix} \tilde{H}_{n-20,k} \\ \tilde{H}_{n-16,k} \\ \tilde{H}_{n-12,k} \\ \tilde{H}_{n-8,k} \\ \hat{H}_{n-5,k} \\ \tilde{H}_{n-4,k} \\ \hat{H}_{n-3,k} \\ \tilde{H}_{n,k} \end{bmatrix} \quad V''_{n,k} = \begin{bmatrix} \tilde{H}_{n-20,k} \\ \tilde{H}_{n-16,k} \\ \tilde{H}_{n-12,k} \\ \tilde{H}_{n-8,k} \\ \hat{H}_{n-6,k} \\ \hat{H}_{n-5,k} \\ \tilde{H}_{n-4,k} \\ \tilde{H}_{n,k} \end{bmatrix} \quad \text{equations (38)}$$

Vectors $V_{n,k}$, $V'_{n,k}$, and $V''_{n,k}$ thus each comprise two components corresponding to channel estimates provided at preceding frequency interpolation steps.

Equations (17) to (28) used for the first example of time interpolation method according to the present invention are thus respectively replaced with the following equations:

$$\hat{H}_{n-3,A} = \theta_3^T V''_{n,A} \qquad \text{equation (39)}$$

$$\hat{H}_{n-3,C} = \theta_1^T V_{n-2,C} \qquad \text{equation (40)}$$

$$\hat{H}_{n-3,D} = \theta_2^T V'_{n-1,D} \qquad \text{equation (41)}$$

$$\hat{H}_{n-2,A} = \theta_2^T V'_{n,A} \qquad \text{equation (42)}$$

$$\hat{H}_{n-2,B} = \theta_3^T V''_{n+1,B} \qquad \text{equation (43)}$$

$$\hat{H}_{n-2,D} = \theta_1^T V_{n-1,D} \qquad \text{equation (44)}$$

$$\hat{H}_{n-1,A} = \theta_1^T V_{n,A} \qquad \text{equation (45)}$$

$$\hat{H}_{n-1,B} = \theta_2^T V'_{n+1,B} \qquad \text{equation (46)}$$

$$\hat{H}_{n-1,C} = \theta_3^T V''_{n+2,C} \qquad \text{equation (47)}$$

$$\hat{H}_{n,B} = \theta_1^T V_{n+1,B} \qquad \text{equation (48)}$$

$$\hat{H}_{n,C} = \theta_2^T V'_{n+2,C} \qquad \text{equation (49)}$$

$$\hat{H}_{n,D} = \theta_3^T V''_{n+3,D} \qquad \text{equation (50)}$$

Of course, the present invention is likely to have various, alterations, improvements, and modifications which will readily occur to those skilled in the art. In particular, the present invention has been described for a COFDM demodulation for which the scattered pilots are arranged every 12 carriers and shifted by 3 carriers from one symbol to the next symbol so that every 4 symbols, the same arrangement of the scattered pilots can be found. Clearly, the arrangement of the scattered pilots may be different. In particular, the shifting of the scattered pilots from one symbol to the other may be different. The number of interpolation filters, $\theta_i$, to be used by the time interpolation method is then accordingly adapted.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of COFDM demodulation of successive symbols of a signal received from a transmission channel, each symbol comprising first carriers modulated in phase and/or in amplitude conveying data which depend on the symbol and second reference carriers called pilots having their frequency positions varying at least partly from one symbol to the next symbol, at least one given carrier from among the second carriers corresponding, for each symbol, to the same pilot, the method comprising, for each symbol, a step of determining a first estimate of the transfer function of the channel for each carrier in a first set of carriers from among the first carriers of said symbol such that, for the frequency positions of the considered carriers, symbols different from said symbol comprise pilots, corresponding to a linear combination of second estimates of the transfer function of the channel determined for pilots at the frequency of said carrier, wherein the coefficients of the linear combination are determined in iterative fashion, a new value of at least one of the coefficients being equal to the sum of the last determined value of said coefficient and of a term comprising the product between an iteration step and an error term equal to the different between the second estimate determined for said given carrier of a symbol, which depends on the coefficient, and the first estimate determined for said given carrier of said symbol, the iteration step being determined in iterative fashion.

2. The method of claim 1, wherein each second estimate determined for a symbol carrier is equal to the ratio between a received coefficient associated with the carrier and a predetermined theoretical coefficient associated with the carrier.

3. The method of claim 1, wherein the first estimate is determined based on at least the second estimate determined for a pilot at the same frequency as said carrier of a symbol received after said symbol.

4. The method of claim 2, wherein the new value of the coefficient is equal to the sum of the last determined value of said coefficient and of a term equal to the product of the iteration step, of the error term, and of the conjugate of the second estimate determined for the given carrier of a symbol which depends on the coefficient.

5. The method of claim 4, comprising the steps, for at least the given carrier of each symbol, of:
   determining a vector having at least some components corresponding to second estimates determined for the given carrier of symbols received before said symbol; and
   determining a new value of the iteration step equal to the sum of the last determined value of the iteration step and of a term equal to the product of a constant term and of the real part of the product of the transpose of the vector, of a weighting array, and of the conjugate of the error term.

6. A COFDM demodulator intended to receive successive symbols of a signal received from a transmission channel, each symbol comprising first carriers modulated in phase and/or in amplitude conveying data which depend on the symbol and second reference carriers called pilots, having their frequency positions varying at least partly from one symbol to the next symbol, at least one given carrier from among the second carriers corresponding, for each symbol, to the same pilot, the demodulator comprising a circuit for determining, for each symbol, a first estimate of the transfer function of the channel for each carrier in a first set of carriers from among the first carriers of said symbol such that, for the frequency positions of the considered carriers, symbols different from said symbol comprise pilots, corresponding to a linear combination of second estimates of the transfer function of the channel determined for pilots at the frequency of said carrier, comprising a circuit for determining in iterative fashion coefficients of the linear combination, a new value of at least one of the coefficients being equal to the sum of the last determined value of said coefficient and of a term comprising the product between an iteration step and an error term equal to the different between the second estimate determined for said given carrier of a symbol which depends on the coefficient and the first estimate determined for said given carrier of said symbol, the demodulator further comprising a circuit for determining in iterative fashion the iteration step.

7. The demodulator of claim 6, comprising a circuit capable of providing each second estimate for a carrier of a symbol as being equal to the ratio between a received coefficient associated with the carrier and a predetermined theoretical coefficient associated with the carrier.

8. The demodulator of claim 6, wherein the circuit for determining the coefficients of the linear combination is capable of providing the new value of the coefficient as being equal to the sum of the last determined value of said coefficient and of a term equal to the product of the iteration step, of the error term, and of the conjugate of the second estimate determined for the given carrier of a symbol which depends on the coefficient.

9. The demodulator of claim 6, wherein the circuit for determining the iteration step comprises:
  a circuit capable, for at least the given carrier of each symbol, of determining a vector having at least some components corresponding to second estimates determined for the given carrier of symbols received before said symbol; and
  a circuit capable of determining a new value of the iteration step equal to the sum of the last determined value of the iteration step and of a term equal to the product of a constant term and of the real part of the product of the transpose of the vector, of a weighting array, and of the conjugate of the error term.

10. The demodulator of claim 9, wherein the circuit for determining the iteration step comprises a circuit capable of determining a new value of the weighting array equal to the sum of the last determined value of the weighting array, of a first term equal to the product of the error term, and of the conjugate of the vector and of a second term equal to the product of the opposite of the iteration step, of the conjugate of the vector, of the transpose of the vector, and of the last determined value of the weighting array.

11. A method for estimating a transfer function of a transmission channel for a plurality of frequency positions for a plurality of symbols of a signal received through the transmission channel, each of the plurality of symbols comprising data carriers and pilot carriers, the method comprising:
  determining, using at least one circuit, a first estimate of the transfer function for a first frequency position of the plurality of frequency positions for a first symbol of the plurality of symbols, the first frequency position corresponding to a pilot carrier of the first symbol, wherein the first estimate is determined based at least in part on a known theoretical value for the pilot carrier;
  determining a second estimate of the transfer function for the first frequency position for the first symbol, wherein the second estimate is determined based at least in part on a first linear combination, the first linear combination using estimates of the transfer function for the first frequency position for other symbols of the plurality of symbols;
  determining an error amount by comparing the first and second estimates;
  determining linear combination coefficients based at least in part on the error amount; and
  determining a third estimate of the transfer function, for a second frequency position of the plurality of frequency positions for a second symbol of the plurality of symbols, the second frequency position corresponding to a data carrier of the second symbol, wherein the third estimate is determined based at least in part on a second linear combination, the second linear combination using the determined linear combination coefficients and estimates of the transfer function for the second frequency position for other symbols of the plurality of symbols.

12. The method of claim 11, wherein all of the plurality of symbols comprise a pilot carrier at the first frequency position.

13. The method of claim 11, wherein determining the first estimate comprises determining a ratio between a received value for the pilot carrier and the known theoretical value.

14. The method of claim 11, wherein determining the error amount comprises subtracting the second estimate from the first estimate.

15. The method of claim 11, wherein the second linear combination uses estimates of the transfer function for symbols comprising a pilot carrier at the second frequency position.

16. The method of claim 11, wherein the second linear combination uses at least one estimate of the transfer function for a symbol received after the second symbol.

17. The method of claim 11, further comprising, for each symbol following the second symbol in the plurality of symbols:
  determining new linear combination coefficients; and
  estimating the transfer function for at least some of the plurality of frequency positions using the determined new linear combination coefficients.

18. The method of claim 11, wherein determining the linear combination coefficients comprises adding a term comprising a product of an iteration step and the error amount to a previous value of at least one of the linear combination coefficients.

19. The method of claim 11, further comprising, for each symbol following the second symbol in the plurality of symbols:
  determining a new iteration step;
  determining new linear combination coefficients using the determined new iteration step; and
  estimating the transfer function for at least some of the plurality of frequency positions using the determined new linear combination coefficients.

20. The method of claim 18, further comprising determining the iteration step based at least in part on a previous value of the iteration step and the error amount.

21. Apparatus for estimating a transfer function of a transmission channel for a plurality of frequency positions for a plurality of symbols of a signal received through the transmission channel, each of the plurality of symbols comprising data carriers and pilot carriers, the apparatus comprising at least one circuit configured to:
  determine a first estimate of the transfer function for a first frequency position of the plurality of frequency positions for a first symbol of the plurality of symbols, the first frequency position corresponding to a pilot carrier of the first symbol, wherein the first estimate is determined based at least in part on a known theoretical value for the pilot carrier;

determine a second estimate of the transfer function for the first frequency position for the first symbol, wherein the second estimate is determined based at least in part on a first linear combination, the first linear combination using estimates of the transfer function for the first frequency position for other symbols of the plurality of symbols;

determine an error amount by comparing the first and second estimates;

determine linear combination coefficients based at least in part on the error amount; and determine a third estimate of the transfer function, for a second frequency position of the plurality of frequency positions for a second symbol of the plurality of symbols, the second frequency position corresponding to a data carrier of the second symbol, wherein the third estimate is determined based at least in part on a second linear combination, the second linear combination using the determined linear combination coefficients and estimates of the transfer function for the second frequency position for other symbols of the plurality of symbols.

22. The apparatus of claim 21, wherein all of the plurality of symbols comprise a pilot carrier at the first frequency position.

23. The apparatus of claim 21, wherein the at least one circuit is configured to determine the first estimate at least in part by determining a ratio between a received value for the pilot carrier and the known theoretical value.

24. The apparatus of claim 21, wherein the at least one circuit is configured to determine the error amount at least in part by subtracting the second estimate from the first estimate.

25. The apparatus of claim 21, wherein the second linear combination uses estimates of the transfer function for symbols comprising a pilot carrier at the second frequency position.

26. The apparatus of claim 21, wherein the second linear combination uses at least one estimate of the transfer function for a symbol received after the second symbol.

27. The apparatus of claim 21, wherein the at least one circuit is further configured to, for each symbol following the second symbol in the plurality of symbols:

determine new linear combination coefficients; and estimate the transfer function for at least some of the plurality of frequency positions using the determined new linear combination coefficients.

28. The apparatus of claim 21, wherein the at least one circuit is configured to determine the linear combination coefficients at least in part by adding a term comprising a product of an iteration step and the error amount to a previous value of at least one of the linear combination coefficients.

29. The apparatus of claim 28, wherein the at least one circuit is further configured to, for each symbol following the second symbol in the plurality of symbols:

determine a new iteration step;

determine new linear combination coefficients using the determined new iteration step; and estimate the transfer function for at least some of the plurality of frequency positions using the determined new linear combination coefficients.

30. The apparatus of claim 28, wherein the at least one circuit is further configured to determine the iteration step based at least in part on a previous value of the iteration step and the error amount.

* * * * *